US012641601B2

(12) United States Patent
Harada et al.

(10) Patent No.: US 12,641,601 B2
(45) Date of Patent: May 26, 2026

(54) TERMINAL, COMMUNICATION METHOD, AND SYSTEM

(71) Applicant: NTT DOCOMO, INC., Tokyo (JP)

(72) Inventors: Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/635,784

(22) Filed: Apr. 15, 2024

(65) Prior Publication Data

US 2024/0267916 A1     Aug. 8, 2024

Related U.S. Application Data

(63) Continuation of application No. 17/297,168, filed as application No. PCT/JP2018/045161 on Dec. 7, 2018, now abandoned.

(51) Int. Cl.
| | |
|---|---|
| *H04W 72/1268* | (2023.01) |
| *H04B 7/0404* | (2017.01) |
| *H04B 7/06* | (2006.01) |
| *H04B 7/08* | (2006.01) |
| *H04W 72/20* | (2023.01) |
| *H04W 88/02* | (2009.01) |

(52) U.S. Cl.
CPC ...... *H04W 72/1268* (2013.01); *H04B 7/0404* (2013.01); *H04B 7/06952* (2023.05); *H04B 7/088* (2013.01); *H04W 72/20* (2023.01); *H04W 88/02* (2013.01)

(58) Field of Classification Search
None
See application file for complete search history.

(56) References Cited

U.S. PATENT DOCUMENTS

| | | |
|---|---|---|
| 2018/0269923 A1 | 9/2018 | Chang et al. |
| 2019/0089506 A1 | 3/2019 | Takeda et al. |
| 2019/0182798 A1 | 6/2019 | Beale et al. |
| 2019/0297603 A1* | 9/2019 | Guo ...................... H04L 5/0053 |

(Continued)

FOREIGN PATENT DOCUMENTS

| | | | |
|---|---|---|---|
| CN | 107872889 A | 4/2018 | |
| WO | WO-2017022902 A1 * | 2/2017 | ............ H04W 72/51 |

(Continued)

OTHER PUBLICATIONS

U.S. Appl. No. 62/753,679, filed Oct. 31, 2018 (Year: 2018).*

(Continued)

*Primary Examiner* — Jay L Vogel
(74) *Attorney, Agent, or Firm* — Osha Bergman Watanabe & Burton LLP

(57)     ABSTRACT

A terminal, as disclosed, includes: a processor that controls a beam used for transmission of a sounding reference signal (SRS) in accordance with presence or absence of a configuration of a spatial domain parameter for the SRS; and a transmitter that transmits the SRS using the beam. The processor respectively uses different beams for a plurality of resources for the SRS when the spatial domain parameter is not configured. Or the processor uses a fixed beam for a plurality of resources for the SRS when the spatial domain parameter is not configured. In other aspects, a communication method and a system are also disclosed.

12 Claims, 7 Drawing Sheets

(56)  References Cited

U.S. PATENT DOCUMENTS

| | | | | |
|---|---|---|---|---|
| 2020/0053752 A1* | 2/2020 | Huang | .............. | H04W 56/0005 |
| 2020/0267770 A1 | 8/2020 | Islam et al. | | |
| 2021/0159966 A1* | 5/2021 | Xi | ........................ | H04B 7/0691 |

FOREIGN PATENT DOCUMENTS

| | | | | |
|---|---|---|---|---|
| WO | 2017/168713 A1 | 10/2017 | | |
| WO | WO-2018028637 A1 * | 2/2018 | ........ | H04W 56/0015 |
| WO | 2018085709 A1 | 5/2018 | | |
| WO | WO-2018082668 A1 * | 5/2018 | ........ | H04W 56/0015 |
| WO | 2018128426 A1 | 7/2018 | | |
| WO | WO-2019095898 A1 * | 5/2019 | ........... | H04B 7/0456 |

OTHER PUBLICATIONS

International Search Report issued in Application No. PCT/JP2018/045161, mailed on Mar. 5, 2019 (5 pages).

Written Opinion issued in International Application No. PCT/JP2018/045161, mailed on Mar. 5, 2019 (6 pages).

3GPP TS 38.214 V15.3.0, Release 15; "3rd Generation Partnership Project; Technical Specification Group Radio Access Network; NR; Physical layer procedures for data;" Sep. 2018; Sophia Antipolis Valbonne, France (96 pages).

3GPP TSG RAN WG1 Meeting #92bis; R1-1804845; "Remaining issues on beam management;" InterDigital, Inc.; Apr. 16-20, 2018; Sanya, China (6 pages).

3GPP TSG RAN WG1 Meeting #91; R1-1719818; "UL multi-TRP/panel/beam operation in R15;" Huawei, HiSilicon; Nov. 27-Dec. 1, 2017; Reno, USA (5 pages).

3GPP TSG RAN WG1 Meeting #92; R1-1802620 "Remaining issues on beam management" InterDigital, Inc.; Athens, Greece; Feb. 26-Mar. 2, 2018 (6 pages).

3GPP TSG RAN WG1 Meeting #90; R1-1712238 "UL SRS design for beam management and CSI acquisition" Huawei, HiSilicon; Prague, Czech Republic; Aug. 21-25, 2017 (12 pages).

3GPP TSG-RAN WG1 Meeting #95; R1-1813150 "On maintenance for BWPs and CA" Nokia, Nokia Shanghai Bell; Spokane, USA; Nov. 12-16, 2018 (6 pages).

3GPP TSG RAN WG1 Meeting #89; R1-1706925 "UL beam management" Huawei, HiSilicon; Hangzhou, China; May 15-19, 2017 (6 pages).

Office Action issued in Japanese Application No. 2020-558791; Dated Aug. 9, 2022 (6 pages).

Extended European Search Report issued in European Application No. 18942213.2, dated Jun. 20, 2022 (12 pages).

Notice of Reasons for Refusal issued in Japanese Application No. 2020-558791 mailed on Oct. 18, 2022 (8 pages).

Samsung, "Issues on beam management", 3GPP TSG RAN WG1 Meeting AH 1801, R1-1800432, Vancouver, Canada, Jan. 22-26, 2018 (12 pages).

Apple, Inc., "Consideration on beam measurement and reporting enhancement", 3GPP TSG RAN WG1 Meeting #95, R1-1812921, Spokane, USA, Nov. 12-16, 2018 (8 pages).

Office Action issued in the counterpart Chinese Patent Application No. 201880099993.9, mailed on May 19, 2023 (16 pages).

Office Action issued in the counterpart Chinese Application No. 201880099993.9, mailed Sep. 22, 2023 (10 pages).

Office Action issued in European Application No. 18942213.2; Dated Nov. 24, 2023 (9 pages).

Office Action issued in Chinese Application No. 201880099993.9; Dated Dec. 1, 2023 (9 pages).

European Office Action in corresponding Application No. 18942213.2 mailed Nov. 13, 2025 (23 pages).

Sony; "Consideration on UL beam management"; 3GPP TSG RAN WG1 Meeting NR3, R1-1716245; Nagoya, Japan; Sep. 18-21, 2017 (3 pages).

* cited by examiner

100 MHz × 4CC based on CA for both DL and UL

DL : 100 MHz × 4CC based on CA
UL : 400 MHz × 1CC

TERMINAL, COMMUNICATION METHOD, AND SYSTEM

CROSS-REFERENCE TO RELATED APPLICATIONS

This application is a continuation application and, thereby, claims benefit under 35 U.S.C. § 120 to U.S. patent application Ser. No. 17/297,168, filed on May 26, 2021, titled "TERMINAL AND COMMUNICATION METHOD," which is a national stage application of PCT Application No. PCT/JP2018/045161, filed on Dec. 7, 2018. The contents of these applications are incorporated by reference in their entirety.

TECHNICAL FIELD

The present disclosure relates to a terminal, a communication method, and a system.

BACKGROUND ART

Future systems of Long Term Evolution (LTE) in a Universal Mobile Telecommunications System (UMTS) network have been studied (see Non-Patent Literature 1). Examples of the future systems of LTE include, for example, systems called LTE-Advanced (LTE-A), Future Radio Access (FRA), the 5th generation mobile communication system (5G), 5G plus (5G+), and New Radio Access Technology (New-RAT; NR).

Further, future radio systems to achieve a broader band and a higher speed than the 5G system, for example, have also been studied.

CITATION LIST

Non-Patent Literature

NPL1
  3GPP TS 38.214 V15.3.0, "NR; Physical layer procedures for data (Release 15)," March 2018

SUMMARY OF INVENTION

Technical Problem

There is still room for consideration, however, on a method of improving Uplink (UL) throughput in the future radio systems.

One object of the present disclosure is to improve the uplink throughput.

Solution to Problem

A terminal according to one aspect of the present disclosure includes: a control section that applies, to uplink transmission, a transmission parameter different from a first transmission parameter corresponding to a reception parameter used for downlink reception, the transmission parameter being a second transmission parameter; and a transmission section that performs the uplink transmission using the second transmission parameter.

Advantageous Effects of Invention

According to the present disclosure, it is possible to improve uplink throughput.

DESCRIPTION OF EMBODIMENTS

Hereinafter, embodiments of the present disclosure will be described with reference to the accompanying drawings.

Embodiment 1

Studies have been carried out on improving uplink (UL) throughput in future radio systems. To improve downlink (DL) throughput (e.g., the throughput of a Transmission Control Protocol (TCP)), for example, the UL throughput is required to be improved for transmitting response signals (e.g., ACK/NACK) to DL signals.

Examples of a technology for achieving a higher speed to improve the UL throughput include, for example, Multiple Input Multiple Output (MIMO), Carrier Aggregation (CA) using a plurality of Component Carriers (CCs), high-order multi-level modulation, and broad band transmission.

However, the MIMO possibly increases cost, sizes, or power consumption of terminals (may also be referred to as user terminals or User Equipment, i.e., UE), for example, due to transmission processing in a plurality of streams. Further, the CA possibly causes an increase in a Peak to Average Power Ratio (PAPR) or a distortion of Intermodulation (IM), for example, as well as the increase of cost, sizes, and power consumption of the terminals, due to signal processing of a plurality of carriers (e.g., CCs). Thus, restrictions of the terminals may not be satisfied by the method of improving the UL throughput by applying a high-speed processing technology such as spatial multiplexing and the CA.

Figure 1A:
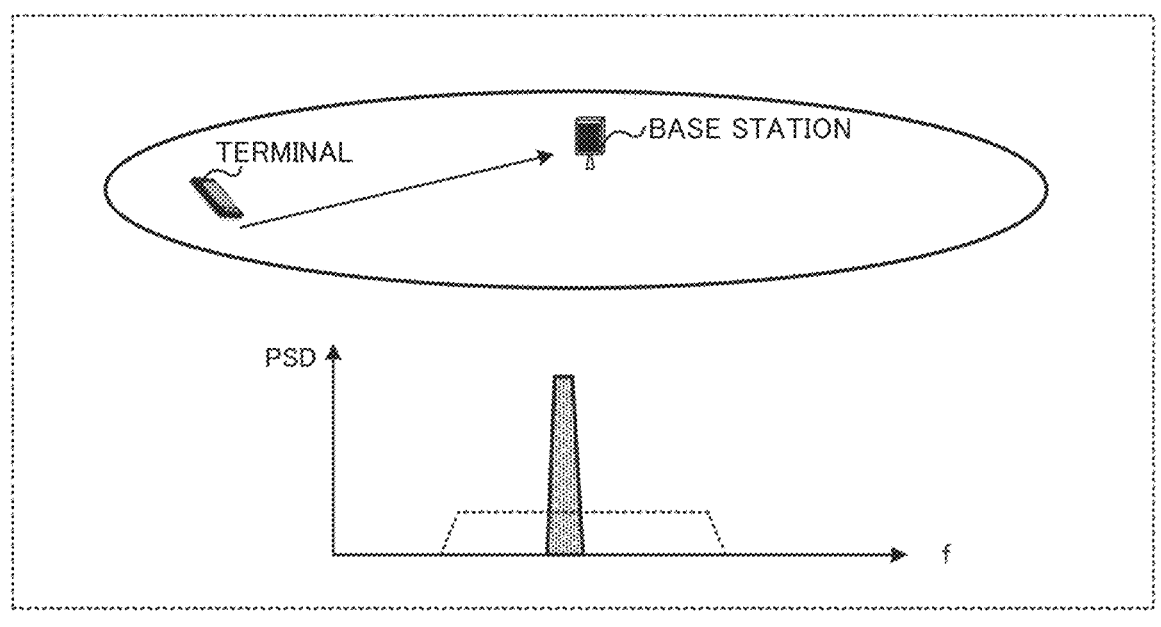
FIG. 1A illustrates exemplary transmit power in narrow band transmission.
Figure 1B:
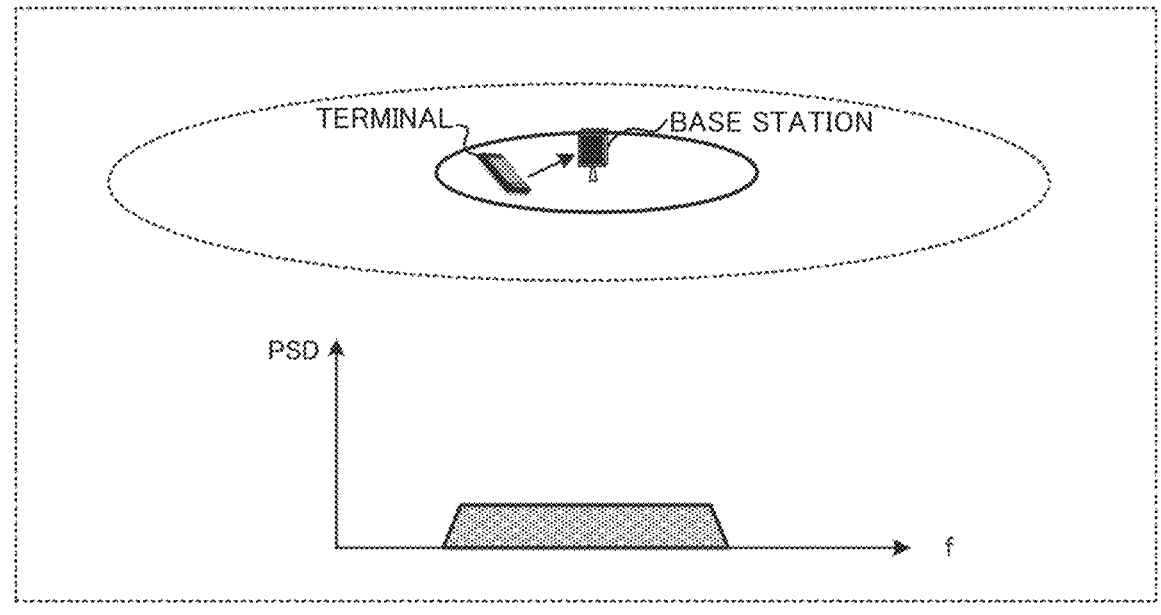
FIG. 1B illustrates exemplary transmit power in broad band transmission.

In addition, the terminals have a limitation on total power consumption compared to base stations (may be referred to as gNBs, for example). FIG. 1A illustrates exemplary transmit power of the terminal in narrow band transmission, whereas FIG. 1B illustrates exemplary transmit power of the terminal in broad band transmission. As illustrated in FIGS. 1A and 1B, a broader communication bandwidth of a UL signal makes the transmit power per unit band (e.g., Power Spectral density (PSD)) smaller, and a communication range (referred to as a coverage, for example) is likely to be narrower. Similarly, for the multi-level modulation, for example, a higher modulation level (degree) of the UL signal requires higher reception quality, and the coverage that can use the higher modulation level is likely to be narrower.

As described above, the communication bandwidth (or the modulation level) and the coverage are in a trade-off relation, and the broad band transmission or the high-order multi-level modulation tends to narrow the coverage for UL transmission of the terminals. Thus, a method can be considered of shortening distance between the base stations and the terminals by, for example, dense deployment of the base stations, in order to improve the UL throughput.

Figure 2:
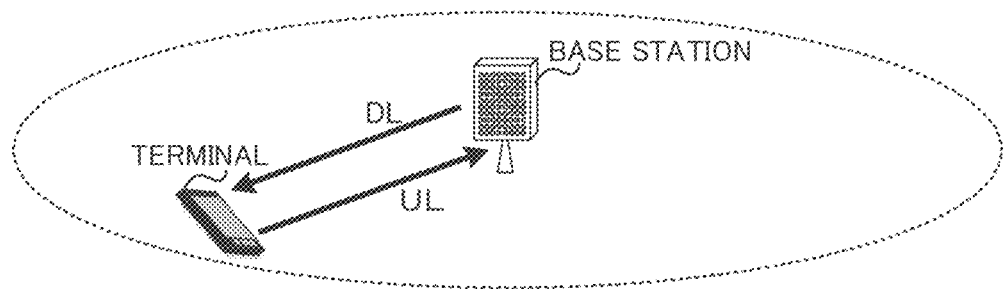
FIG. 2 illustrates an exemplary configuration of a radio communication system.

FIG. 2 illustrates an exemplary configuration of a radio communication system including a base station covering a certain DL area and a terminal existing in the DL area. The terminal illustrated in FIG. 2 radio-connects to (or accesses) the base station, receives DL signals, and transmits UL signals.

Figure 3:
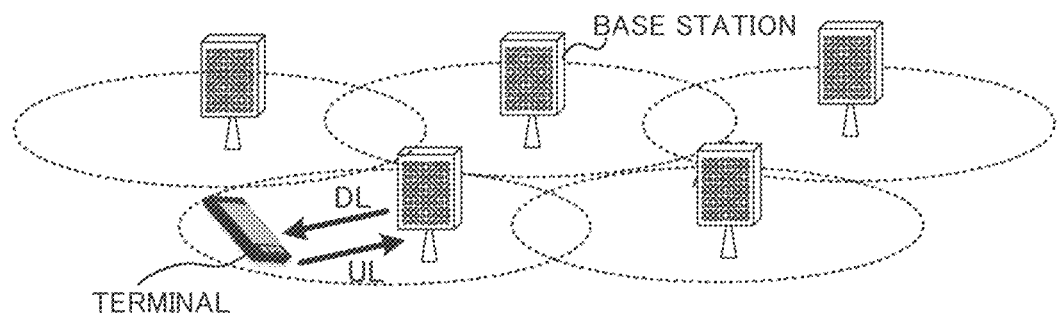
FIG. 3 illustrates an exemplary configuration of another radio communication system.

FIG. 3 illustrates an exemplary configuration of a radio communication system in which base stations are densely deployed compared to FIG. 2. The terminal illustrated in FIG. 3 radio-connects to (or accesses) at least one of the plurality of base stations densely deployed. In FIG. 3, the terminal transmits UL signals by broad band single-carrier transmission, for example. The single-carrier transmission enables broad band transmission without applying the CA, for example, thereby improving the UL throughput. For example, terminal 30 may use a relatively higher frequency band (e.g., a frequency band higher than or equal to 3.5 GHz) in the broad band transmission.

The dense deployment of the base stations as illustrated in FIG. 3, however, increases cost or processing time. Further, to densely deploy the base stations gradually, antenna tilt of the base stations or a parameter for DL interference adjustment, for example, needs to be changed each time the deployment of the base stations is changed (e.g., addition, change, or removal of the base stations).

Figure 4:
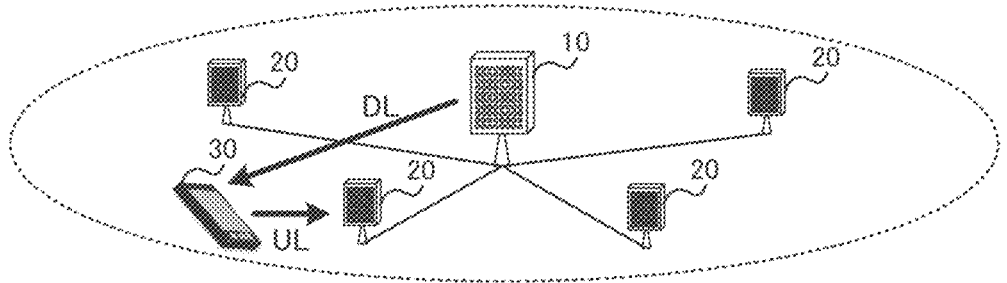
FIG. 4 illustrates an exemplary configuration of still another radio communication system.

In this regard, there is a method illustrated in FIG. 4, for example. The method includes deploying the base stations having relatively small areas (i.e., the dense deployment) as illustrated in FIG. 3 for UL, while keeping a relatively wide DL area as illustrated in FIG. 2 for DL. In FIG. 4, terminal 30 radio-connects, for DL, to base station 10 (described later in detail) forming a DL area, and radio-connects, for UL, to base station 20 (described later in detail) densely deployed in the DL area. In other words, the base station connected to terminal 30 for DL and the base station connected to terminal 30 for UL may be different from each other.

For example, base stations 20 are radio apparatuses that each include a configuration related to UL radio processing (i.e., radio reception processing) while not including a configuration related to DL radio processing (i.e., radio transmission processing). In other words, base stations 20 are UL reception-only stations. In this case, the change of the deployment of base stations 20 (e.g., addition, change, or removal of base stations 20) does not affect DL communication by base station 10, and does not cause the parameter change for the DL interference adjustment in base station 10. In addition, base stations 20 as UL reception-only stations perform no DL transmission, and this eliminates the need for acquiring a radio license, or adjusting the interference, for example, for base stations 20, thereby simplifying installation procedures or designs of base stations 20.

Here, operations will be examined when base station 10 connected to terminal 30 for DL and base station 20 connected to terminal 30 for UL are different from each other, as illustrated in FIG. 4.

For example, the following is discussed regarding UL beam control (referred to as UL beam management, for example).

First, a beam control method of the terminal will be described in a case where the terminal connects to the same base station for DL and UL as illustrated in FIG. 2 or FIG. 3. Such a beam control method is referred to as, for example, beam correspondence. For example, the terminal configures a DL beam (i.e., a reception beam of the terminal) using a DL reference signal (e.g., Synchronization Signal Block (SSB)) transmitted from the base station. The terminal then configures a beam in the similar direction to that of the configured reception beam as a UL beam (i.e., a transmission beam of the terminal). As described above, this beam control method uses, for the UL beam control (i.e., UL transmission of the terminal), a transmission parameter corresponding to a reception parameter used for the DL beam control (i.e., DL reception of the terminal).

When such a beam control method is applied to the radio communication system illustrated in FIG. 4, terminal 30 may configure a transmission beam toward base station 10 connected for DL, and may not configure the transmission beam toward base station 20 in a different direction from base station 10. Without an appropriate configuration of the transmission beam toward base station 20, the base station cannot receive a signal even when the terminal performs UL transmission using a broad band and high-order multi-level modulation. This causes deterioration of the UL throughput.

Herein, a description will be given of, for example, a UL beam control method capable of improving the UL throughput in the radio communication system illustrated in FIG. 4, in one aspect of the present disclosure.

[Configuration of Radio Communication System]

The radio communication system according to the present embodiment includes, for example, base station 10, base stations 20, and terminal 30 as illustrated in FIG. 4. Note that the configuration of the radio communication system illustrated in FIG. 4 is an example. For example, the respective numbers of base station 10, base stations 20, and terminal 30 are not limited to the numbers illustrated in FIG. 4.

Base station 10 transmits a DL signal to terminal 30. Base station 20 receives a UL signal transmitted from terminal 30. Terminal 30 receives the DL signal transmitted from base station 10, and transmits the UL signal to base station 20.

For example, base station 10 and base stations 20 are connected by wired or radio networks, e.g., referred to as backhauls (not illustrated). For example, base station 20 transmits, to base station 10, the UL signal received from terminal 30 or control information generated using the UL signal.

[Configuration of Base Station 10]

Figure 5:
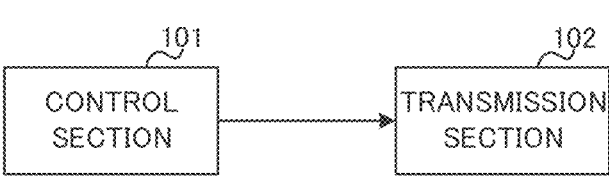
FIG. 5 is a block diagram illustrating an exemplary configuration of a base station.

FIG. 5 is a block diagram illustrating an exemplary configuration of base station 10 according to the present embodiment. Base station 10 includes, for example, control section 101, and transmission section 102.

Note that, although FIG. 5 illustrates configuration sections of base station 10 to transmit a DL signal, base station 10 may be provided with a reception section (not illustrated) that receives a UL signal. Base station 10 may receive a UL signal transmitted from terminal 30 in the reception section, for example.

Control section 101 controls transmission processing in transmission section 102. For example, control section 101 controls transmission of control information for terminal 30 in transmission section 102. In addition, control section 101 uses a UL signal (or information based on the UL signal) transferred from base station 20 and controls a beam to be used by terminal 30 (e.g., a UL transmission beam) or a beam to be used by base station 20 (e.g., a UL reception beam), for example. Further, control section 101 controls random access (RA) processing for terminal 30, for example.

Transmission section 102 transmits a signal (DL signal) for terminal 30 to terminal 30. For example, transmission section 102 transmits the DL signal by the control of control section 101.

The DL signal includes, for example, DL data (also referred to as a Physical Downlink Shared Channel (PDSCH) signal, for example), DL control information (e.g., Downlink Control Information (DCI)), or a reference signal. The DL control information includes, for example, an RA message (also referred to as a Random Access Response (RAR) or message 2, for example) including a Timing Advance (TA) command, and information indicating a resource configuration for a UL reference signal. Note that the UL reference signal is a Sounding Reference Signal (SRS), for example.

The DL control information may be indicated to terminal 30 by, for example, higher layer signaling or dynamic signaling such as the DCI. The higher layer signaling may also be referred to as Radio Resource Control (RRC) signaling or a higher layer parameter, for example.

[Configuration of Base Station 20]

Figure 6:
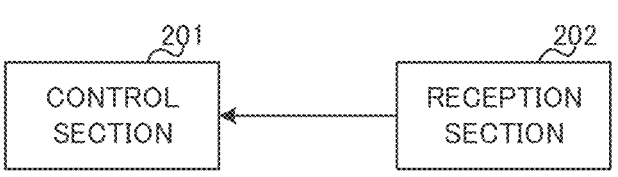
FIG. 6 is a block diagram illustrating an exemplary configuration of another base station.

FIG. 6 is a block diagram illustrating an exemplary configuration of base station 20 according to the present embodiment. Base station 20 includes, for example, control section 201 and reception section 202.

Control section 201 controls reception processing in reception section 202. For example, control section 201 controls reception of a UL signal (e.g., a reference signal such as an SRS). In addition, control section 201, for example, controls transmission of a UL signal received from terminal 30 or control information generated using the UL signal to another base station (e.g., base station 10).

Reception section 202 receives a signal (UL signal) transmitted from terminal 30. For example, reception section 202 receives the UL signal by the control of control section 201.

The UL signal includes, for example, a reference signal (e.g., SRS), an RA signal, and UL data (also referred to as a Physical Uplink Shared Channel (PUSCH) signal, for example).

[Configuration of Terminal 30]

Figure 7:
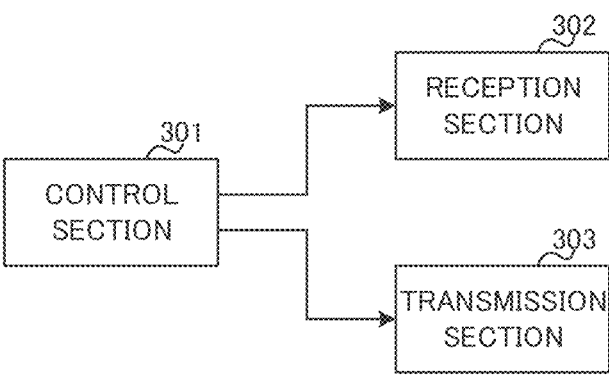
FIG. 7 is a block diagram illustrating an exemplary configuration of a terminal.

FIG. 7 is a block diagram illustrating an exemplary configuration of terminal 30 according to the present embodiment. Terminal 30 includes, for example, control section 301, reception section 302, and transmission section 303.

Control section 301 controls, for example, reception processing in reception section 302 and transmission processing in transmission section 303. For example, control section 301 controls a transmission beam to be used for SRS transmission. Control section 301 configures the transmission beam toward base station 10 or base station 20, for example, based on the control information indicated from base station 10. Note that control section 301 may configure the transmission beam toward any one of base station 10 and a plurality of base stations 20 illustrated in FIG. 4, for example, or may configure the transmission beams toward the plurality of base stations.

In addition, control section 301, for example, detects a TA command from the received DL signal, and adjusts a communication timing of the UL signal using the detected TA command.

Reception section 302 receives a DL signal transmitted from base station 10. For example, reception section 302 receives the DL signal by the control of control section 301.

Transmission section 303 transmits a UL signal to base station 20. For example, transmission section 303 transmits the UL signal by the control of control section 301. For example, transmission section 303 transmits the UL signal using the transmission beam indicated by control section 301.

[Transmission Beam Control Method]

Next, an exemplary transmission beam control method in terminal 30 will be described.

Terminal 30, for example, transmits SRSs by switching a plurality of transmission beams, i.e., SRS resources, (also referred to as beam sweeping) in order to configure a transmission beam toward base station 20 as a destination of a UL signal. The network side (e.g., base station 10 or base station 20) configures at least one transmission beam from the plurality of transmission beams by using measurement values of the SRSs received in base stations 20. For example, the network side may configure, to terminal 30, at least one transmission beam with the SRS measurement value of equal to or greater than a threshold.

For SRS beam sweeping, base station 10 indicates (i.e., instructs), for example, SRS resource information (also referred to as SRS resources or SRS resource sets, for example) to terminal 30. The SRS resource information may be indicated using at least one of higher layer signaling and dynamic signaling.

The SRS resource information includes, for example, transmission beams (e.g., beam numbers or SRS resource numbers) for terminal 30 and transmission timings (i.e., time resources) of the SRSs respectively corresponding to the transmission beams.

Figure 8:
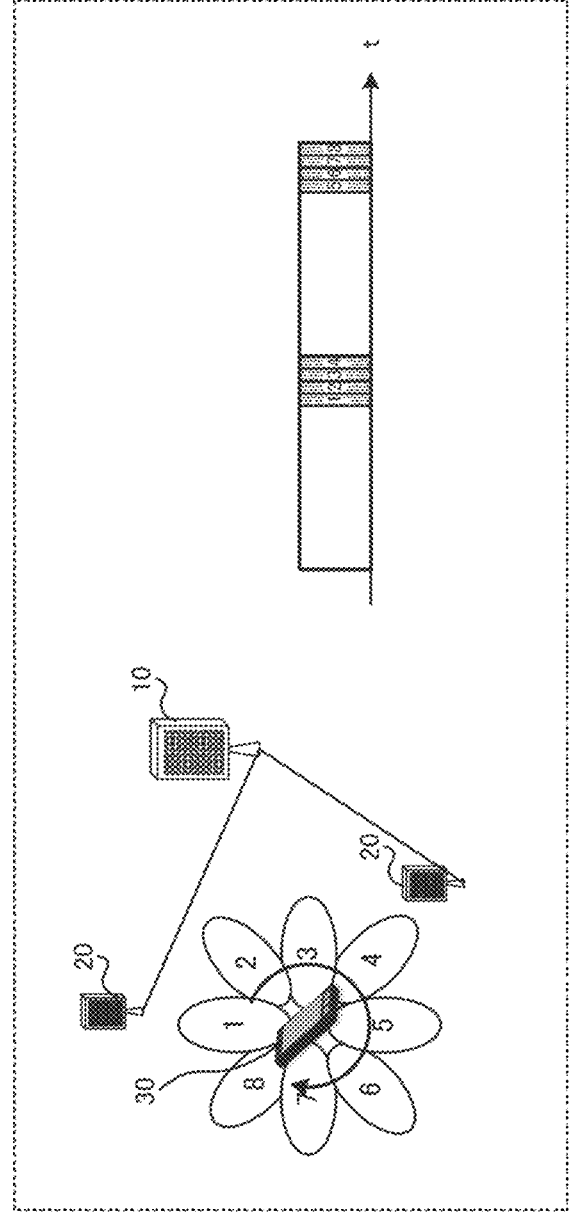
FIG. 8 illustrates exemplary SRS resources according to Embodiment 1.

FIG. 8 illustrates exemplary SRS resources configured for terminal 30.

In FIG. 8, terminal 30 is configured with eight transmission beams (e.g., beam numbers (or beam IDs) 1 to 8). Note that the beam numbers may also be referred to as resource numbers (or resource IDs).

In FIG. 8, terminal 30 is also configured with SRS transmission timings (i.e., time resources) respectively corresponding to the transmission beams with the beam numbers 1 to 8.

After receiving the SRS resource information from base station 10, terminal 30 transmits SRSs based on the SRS resource information. In FIG. 8, terminal 30 transmits SRSs at the transmission timings respectively corresponding to the transmission beams in the order of the beam numbers 1 to 8 of the transmission beams, for example.

The network side (e.g., base station 10 or base station 20) selects a transmission beam used by terminal 30, using, for example, the measurement values (e.g., the received power values) of the SRSs at base stations 20. For example, base station 10 determines, as the transmission beam used by terminal 30, a transmission beam corresponding to the SRS with a higher SRS measurement value received at base station 20 among the plurality of transmission beams (transmission beams with beam numbers 1 to 8 in FIG. 8). Base station 10 indicates, to terminal 30, information indicating the determined transmission beam (for example, the beam number or the SRS number, e.g., SRS-Resource ID, corresponding to the selected beam).

Terminal 30 configures the transmission beam based on the information indicating the transmission beam indicated from base station 10. Terminal 30 then performs beam forming using the configured transmission beam, and transmits the UL signal (e.g., the PUSCH signal or the RA signal) to base station 20.

As described above, terminal 30 can control a transmission beam for UL signal transmission different from a transmission beam for DL even when terminal 30 radio-connects to different base stations for UL and DL. This control enables terminal 30 to, for example, transmit the UL signal with a transmission beam toward base station 20 having a higher UL reception quality from terminal 30, thereby improving the UL throughput.

Note that FIG. 8 is an example, and the number of the SRS transmission beams configured for terminal 30 is not limited to eight. Another number of transmission beams may be configured for terminal 30. In addition, the time resources to which the SRSs for beam sweeping are mapped may be contiguous resources (e.g., contiguous slots) or non-contiguous resources (e.g., non-contiguous slots).

Further, the SRS transmission timings for terminal 30 may be indicated to terminal 30 by, for example, the SRS resource information (e.g., resource Type). The SRS transmission timings may be, for example, periodic or aperiodic, and may be configured semi-persistently.

[Indication Method of Beam Sweeping]

Next, a description will be given of an exemplary indication method from base station 10 to terminal 30 regarding the transmission beam control (e.g., beam sweeping) described above.

For example, the 3GPP standard specifies a parameter indicating the use of a resource configuration (referred to as "usage", for example) in parameters included in the SRS resource information (e.g., the SRS resource set). When the above parameter indicating the use indicates beam control (e.g., usage=beamManagement), for example, the terminal performs beam sweeping using SRSs.

In the present embodiment, the base station radio-connected to the terminal is the same for DL and UL in some cases and different in other cases, as described above. The patterns or numbers of transmission beams (i.e., transmission beam candidates or SRS resource candidates) applied to SRSs are different for the transmission beam control in each case.

For example, in the case where the base station radio-connected to the terminal is the same for DL and UL as in FIG. 3, terminal 30 selects, as a UL transmission beam, a beam in the similar beam direction to that of a reception beam configured for terminal 30 for DL, or a beam in a specific direction. Meanwhile, in the case where the base station radio-connected to the terminal is different for DL and UL, terminal 30, for example, transmits SRSs using transmission beams selectable by terminal 30 for UL (e.g., all beams) as illustrated in FIG. 8 (beam sweeping).

Herein, the SRS resource information (e.g., a parameter indicating beam sweeping) from base station 10 to terminal 30 may include information for distinguishing (i.e., identifying or discriminating) the use of the SRS beam control (beam sweeping) between the case where the base station radio-connected to terminal 30 is the same for DL and UL and the case where the base station radio-connected to terminal 30 is different for DL and UL. In other words, the parameter on the SRS beam control signaled from base station 10 to terminal 30 include information for distinguishing between SRS transmission control from terminal 30 to base station 10 and SRS transmission control from terminal

30 to base station 20 (in other words, information for distinguishing destinations of the SRSs).

For example, different values may be specified for the parameter (e.g., usage) indicating the use of the resource configuration for the SRSs specified in the 3GPP standard, between the case where the base station radio-connected to terminal 30 is the same for DL and UL and the case where the base station radio-connected to terminal 30 is different for DL and UL. Terminal 30 configures the SRS transmission beams (i.e., the SRS resources) in accordance with the parameter (e.g., usage) indicating the use of the resource configuration for the SRSs.

Alternatively, the same value (e.g., usage=beam- Management) may be specified for the parameter indicating the use of the resource configuration for the SRSs, between the case where the base station radio-connected to terminal 30 is the same for DL and UL and the case where the base station radio-connected to terminal 30 is different for DL and UL. In other words, the parameter indicating the use of the SRS resource configuration in the case where the base station radio-connected to terminal 30 is the same for DL and UL, may be reused for the case where the base station radio-connected to terminal 30 is different for DL and UL.

When the parameter indicating the use of the SRS resource configuration is reused as described above, a parameter for identifying the two cases of the base station radio-connected to terminal 30 for UL may be indicated from base station 10 to terminal 30 in addition to the parameter indicating the use. In other words, base station 10 may indicate, to terminal 30, a parameter for allowing terminal 30 to recognize whether terminal 30 performs beam sweeping toward base station 20 with a plurality of beams (e.g., all beams).

For example, the parameter indicating whether terminal 30 performs beam sweeping with a plurality of beams may be explicitly indicated from base station 10 to terminal 30. Terminal 30 performs beam sweeping toward base station 20 (see, for example, FIG. 8), for example, when the parameter indicating the use of the SRS resource configuration is beam sweeping, and the explicitly indicated parameter indicates that the beam sweeping with a plurality of beams is performed. In contrast, terminal 30 performs beam sweeping toward base station 10 (not illustrated), for example, when the parameter indicating the use of the SRS resource configuration is beam sweeping, and the explicitly indicated parameter indicates that the beam sweeping with a plurality of beams is not performed.

Alternatively, the parameter indicating whether terminal 30 performs the beam sweeping with a plurality of beams toward base station 20 may be implicitly indicated from base station 10 to terminal 30.

An example of the implicit indication may include the use of a parameter (e.g., spatialRelationinfo) on a spatial domain of the SRS included in the SRS resource information (e.g., SRS resources).

The parameter on the spatial domain of the SRS includes, for example, information indicating beams used for reference signals such as a synchronization Signal Block (SSB), a Channel State Information Reference Signal (CSI-RS), or an SRS. When the base station radio-connected to terminal 30 is the same for DL and UL as in FIG. 3, for example, the parameter on the spatial domain of the SRS includes information indicating a beam used for a DL reference signal. When no value is set for the parameter on the spatial domain of the SRS, terminal 30 can configure any beam for the SRS.

By way of example here, when the parameter indicating the use of the SRS resource configuration indicates beam sweeping, terminal 30 switches beam control (beam sweeping) for the SRS according to the parameter on the spatial domain of the SRS. When no value is set for the parameter on the spatial domain of the SRS, for example, terminal 30 recognizes (i.e., determines or decides) that the SRS beam sweeping toward base station 20 (e.g., omni-directional beam sweeping) is indicated. Meanwhile, when a value is set for the parameter on the spatial domain of the SRS, terminal 30 recognizes that the SRS beam sweeping toward base station 10 using the value indicated in the parameter on the spatial domain of the SRS (e.g., the beam used for the DL reference signal) is indicated.

As another example of the implicit indication, terminal 30 may recognize that the SRS beam sweeping toward base station 20 is indicated when the SRS resource information indicates the same number of SRS resources as the number of transmission beams configurable for terminal 30.

For example, eight beams (i.e., SRS resources) are configurable for terminal 30 in FIG. 8. In this case, terminal 30 recognizes that the SRS beam sweeping toward base station 20 (e.g., omni-directional beam sweeping) is indicated when eight SRS resources are indicated in the SRS resource information. Meanwhile, terminal 30 recognizes that the SRS beam sweeping toward base station 10 (e.g., beam sweeping in a specific direction) is indicated when less than eight SRS resources are indicated in the SRS resource information.

Such implicit indication can reduce signaling to terminal 30. Note that the implicit indication is not limited to the examples described above. The implicit indication only needs to be information that allows terminal 30 to recognize which of base station 10 or base station 20 terminal 30 performs the SRS beam sweeping toward (i.e., information that allows to determine a destination of UL transmission).

Note that terminal 30 may report the number of beam patterns for SRS beam sweeping to a network. For example, the terminal capability information (UE capability) of terminal 30 may include the number of beam patterns for SRS beam sweeping. The network (e.g., base station 10) may determine the SRS resource configuration for terminal 30 based on the number of beam patterns for SRS beam sweeping indicated in the terminal capability information reported from terminal 30, for example. In other words, the network (e.g., base station 10) can determine whether broad band transmission can be performed by terminal 30 based on the number of beam patterns for SRS beam sweeping indicated in the terminal capability information reported from terminal 30.

[Reception Beam Control Method for SRS]

Next, an exemplary reception beam control method in base station 20 will be described.

Base station 20 receives the SRS while switching a plurality of reception beams, i.e., SRS resources, (also referred to as beam sweeping), for example, in order to configure a reception beam toward terminal 30 from which a UL signal is transmitted. At this time, terminal 30 repeatedly transmits (i.e., performs repetition transmission of) SRSs using, for example, at least one transmission beam in a specific direction. The number of the SRSs corresponds to the number of reception beams to be switched by base station 20.

For the reception beam control of base station 20 described above, base station 10 indicates, to terminal 30, the SRS resource information (e.g., the SRS resource set) including a parameter on the reception beams configured for base station 20, for example. In other words, the SRS resource information includes at least information on the reception control (e.g., the reception beam control) for the SRS in base station 20.

The SRS resource information includes, for example, a transmission beam (e.g., a beam number or an SRS resource number) for terminal 30 and transmission timings (i.e., time resources) of the SRSs.

Note that the transmission beam configured for terminal 30 may be, for example, a transmission beam configured by the transmission beam control described above. For example, the transmission beam configured for terminal 30 (e.g., an SRS ResourceId indicating the SRS resource corresponding to the transmission beam) may be configured for the parameter on the spatial domain of the SRS (e.g., spatialRelationInfo of the SRS resource) in the SRS resource information.

Figure 9:
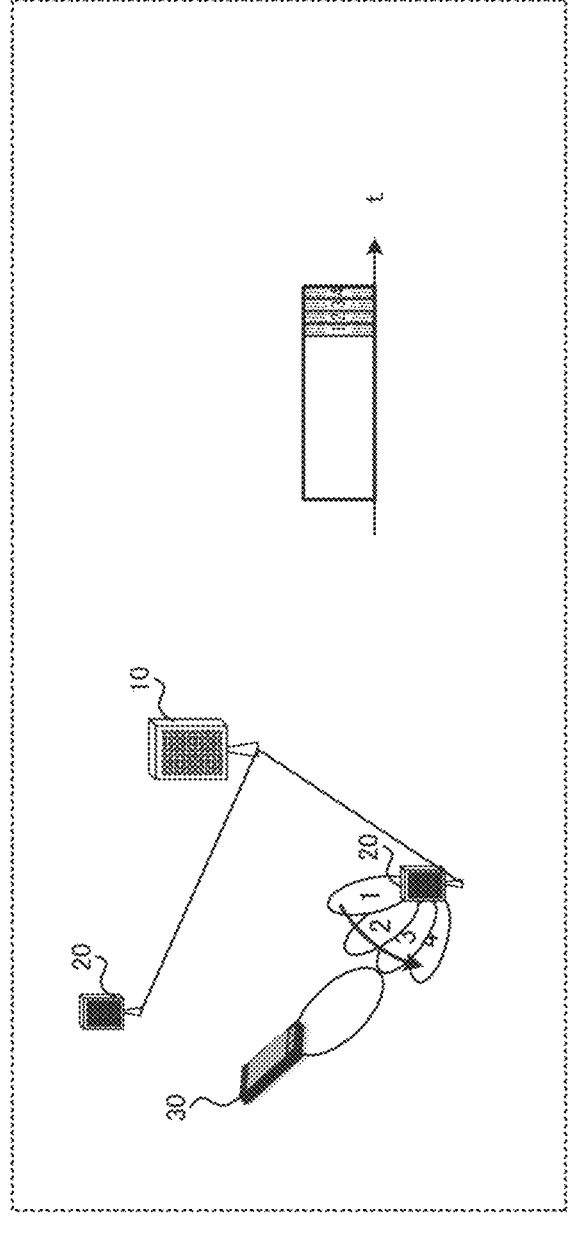
FIG. 9 illustrates other exemplary SRS resources according to Embodiment 1.

FIG. 9 illustrates exemplary SRS resources configured for terminal 30.

In FIG. 9, terminal 30 is configured with a single transmission beam (i.e., SRS resource) in a specific direction. In addition, base station 20 uses reception beams in four directions in FIG. 9, and terminal 30 is thus configured with four SRS resources (i.e., transmission timings or time resources).

After receiving the SRS resource information from base station 10, terminal 30 transmits SRSs based on the SRS resource information. For example, in FIG. 9, terminal 30 repeatedly transmits four SRSs, which is the same number as that of the reception beams configured for base station 20, using the specific transmission beam.

Meanwhile, base station 20, for example, receives the SRSs at reception timings respectively corresponding to the reception beams, in the order of beam numbers 1 to 4 of the configured reception beams, in FIG. 9. Base station 20 selects the reception beam to be used for receiving the UL signal based on the measurement values (e.g., the received power values) of the SRSs received using the reception beams. Note that the selection processing of the reception beam may be performed by a base station other than base station 20 (e.g., base station 10).

The SRS resource information from base station 10 to terminal 30 may include information for distinguishing (i.e., identifying or discriminating) the use of the SRS beam control (beam sweeping), for the reception beam control as well as the transmission beam control.

For example, a value indicating that base station 20 performs beam sweeping with a plurality of reception beams may be specified for the parameter (e.g., usage) indicating the use of the SRS resource configuration.

Alternatively, a value indicating the beam control (beam sweeping) specified for the parameter (e.g., usage) indicating the use of the SRS resource configuration (e.g., usage=beamManagement), for example, may be reused for the beam sweeping with a plurality of reception beams by base station 20. In this case, a parameter indicating whether base station 20 performs the beam sweeping with a plurality of reception beams (i.e., whether terminal 30 performs the repetition transmission in a specific direction), for example, may be separately indicated to terminal 30 either explicitly or implicitly.

An exemplary reception beam control method in base station 20 has been described, thus far.

As described above, in the present embodiment, the first transmission parameter corresponds to a reception parameter used for DL reception (e.g., a parameter on a transmission beam corresponding to a reception beam for DL), and the second transmission parameter (e.g., a parameter on a transmission beam toward base station 20) different from the first transmission parameter is applied to UL transmission.

For example, terminal 30 controls a destination of the UL transmission (e.g., base station 10 or base station 20) based on information for distinguishing destinations of SRSs and SRS resource information. This control enables terminal 30 to configure the transmission beam corresponding to the direction of base station 20 when transmitting a UL signal to base station 20 capable of broad band transmission, even in a case where the direction of base station 20 is different from the direction of base station 10 connected to terminal 30 for DL. With this configuration, terminal 30 can perform broad band transmission toward base station 20, for example, and improve the UL throughput.

Further, terminal 30 controls repetition (e.g., the number of repetitions) of the UL transmission based on a parameter indicating the use of the SRS or the SRS resource information, for example. With this control, the reception beam of base station 20 capable of broad band transmission can be appropriately configured in the direction of terminal 30. This configuration enables terminal 30 to perform broad band transmission toward base station 20, for example, and improve the UL throughput.

Embodiment 2

The UL beam control has been described in Embodiment 1. In the present embodiment, in contrast, timing advance (TA) control will be described.

Note that base stations and a terminal according to the present embodiment have the same basic configurations as those of base station 10, base station 20 and terminal 30 according to Embodiment 1, and thus FIGS. 5, 6 and 7 will be used for the description.

When the base station connected to terminal 30 for DL and the base station connected to terminal 30 for UL are different from each other as illustrated in FIG. 4, terminal 30 performs TA control toward base station 20 separately from initial connection with base station 10, in order to adjust a UL transmission timing. In other words, terminal 30 transmits a Physical Random Access Channel (PRACH) signal, which is also referred to as an RA preamble or Message 1, to base station 20.

Base station 20 configures a TA value of terminal 30 using the PRACH signal transmitted from terminal 30. Note that base station 10 may configure the TA value of terminal 30 in place of base station 20. Base station 10 then transmits, to terminal 30, a signal including a TA command, which is also referred to as RAR or message 2, indicating the TA value configured for terminal 30. Terminal 30 adjusts the transmission timing of a UL signal to base station 20 based on the received TA value.

Next, a description will be given of an exemplary method of transmitting the PRACH signal to base station 20 in the TA control.

The following describes an operation of contention based random access (CBRA) before terminal 30 transitions to a Connected mode (e.g., during an Idle mode or an Inactive mode) and after the transition, and an operation of contention free random access (CFRA) when terminal 30 is in the Connected mode.

[CBRA Operation Before and After Terminal 30 Transitions to Connected Mode]

For example, base station 10 indicates, to terminal 30, control information on beam control (e.g., beam sweeping)

for the PRACH signal transmitted to base station 20, using broadcast information or higher layer signaling.

The control information includes, for example, information indicating a resource configuration (e.g., beam numbers (or resource numbers), and time resources) for transmitting the PRACH signal, as is the case with the SRS transmission beam control in Embodiment 1.

Terminal 30 transmits the PRACH signal using at least one transmission beam based on the control information indicated from base station 10.

Note that beam sweeping for the PRACH signals may be performed for at least one of PRACH formats. In other words, terminal 30 may transmit a plurality of PRACH signals using different transmission beams in at least one of the PRACH formats. Thus, the PRACH signals may be integrally transmitted using a plurality of transmission beams in at least single transmission processing of the PRACH signals. The processing of integrally transmitting the PRACH signals of the transmission beams allows terminal 30 to transmit the PRACH signals using a plurality of transmission beams in one or more PRACH formats. This improves the efficiency of RA processing.

[CFRA Operation when Terminal 30 is in Connected Mode]

In some cases, a PRACH resource is configured by higher layer signaling for terminal 30 that is in a Connected mode. For example, a PRACH resource for contention free random access (CFRA) may be configured for terminal 30 that is in the Connected mode.

In this case, base station 10 indicates, to terminal 30, resource information indicating the PRACH resource for terminal 30, for example.

The resource information indicating the PRACH resource includes, for example, information indicating a transmission beam to be used for transmitting a PRACH signal. The transmission beam to be used for transmitting the PRACH signal is, for example, a transmission beam selected by the SRS beam sweeping described in Embodiment 1. For example, the transmission beam selected by the SRS beam sweeping (e.g., an SRS ResourceId indicating an SRS resource corresponding to the transmission beam) may be configured for a parameter on a spatial domain (e.g., spatialRelationInfo) in the resource information.

Terminal 30 configures the transmission beam for the PRACH signal based on the resource information indicating the PRACH resource, for example, and transmits the PRACH signal using the configured transmission beam.

Descriptions have been given of the operation before terminal 30 transitions to the Connected mode, and the operation when terminal 30 is in the Connected mode, thus far.

As described above, in the present embodiment, the first transmission parameter corresponds to a reception parameter used for DL reception (e.g., a parameter on a transmission beam corresponding to a reception beam for DL), and terminal 30 applies, to UL transmission, the second transmission parameter (e.g., a parameter on a transmission beam for a PRACH signal) different from the first transmission parameter.

For example, terminal 30 transmits the PRACH signal based on resource information for transmitting the PRACH signal to base station 20, and controls the timing of UL transmission. This control enables terminal 30 to appropriately transmit the PRACH signal to base station 20 even when the direction of base station 20 is different from the direction of base station 10 connected to terminal 30 for DL. With this transmission processing, terminal 30 can perform broad band transmission, for example, by appropriately adjusting the transmission timing of the UL signal to base station 20, thereby improving the UL throughput.

Embodiment 3

In the present embodiment, a description will be given of a configuration method for DL and UL frequency bands when a base station connected to a terminal for DL and a base station connected to the terminal for UL are different from each other.

Note that the base stations and the terminal according to the present embodiment have the same basic configurations as those of base station 10, base station 20 and terminal 30 according to Embodiment 1, and thus FIGS. 5, 6 and 7 will be used for the description.

For example, Release 15 of 3GPP or the like includes a restriction of aligning the center frequencies of the DL and UL frequency bands (e.g., bandwidth parts (BWPs)) allocated to the terminal in Time Division Duplex (TDD).

In a radio communication system according to the present embodiment, for example, a terminal configured with a narrow band carrier (e.g., 100 MHz/CC) for UL and a terminal configured with a broad band carrier (e.g., 400 MHz/CC) for UL coexist (or are mixed) in some cases.

Figure 10:
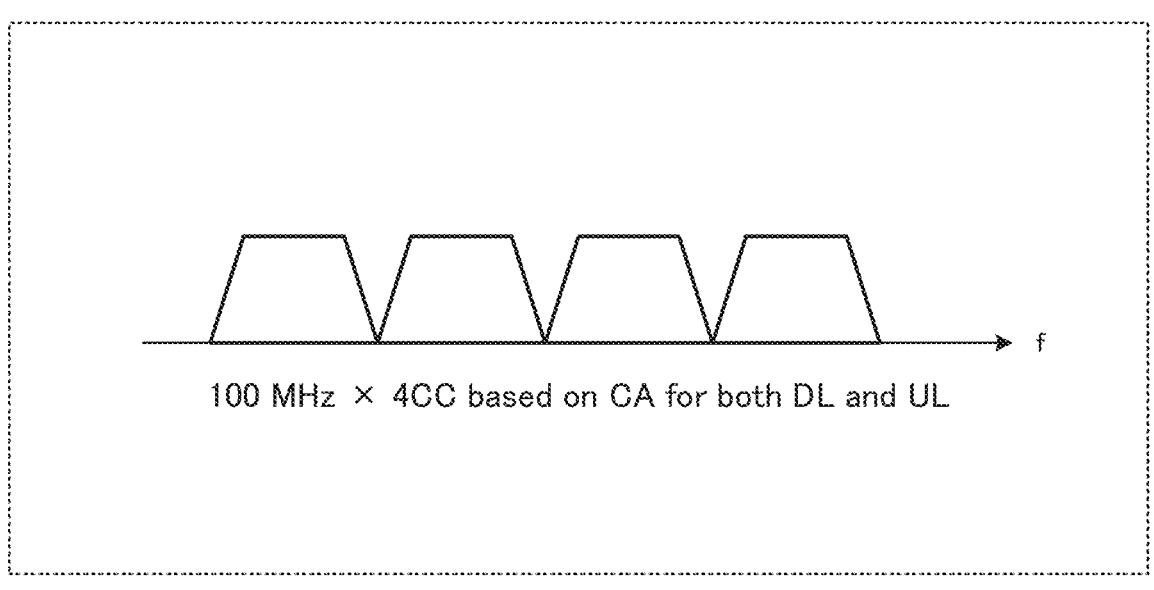
FIG. 10 illustrates exemplary frequency bands allocated to the terminal.

FIG. 10 illustrates exemplary frequency bands allocated to the terminal configured with narrow band carriers for UE. In FIG. 10, bands of 4 CCs are configured for DL by CA (e.g., 100 MHz×4 CCs), and a band of any single CC among the 4 CCs is configured for UL (100 MHz×1 CC), for example.

Figure 11:
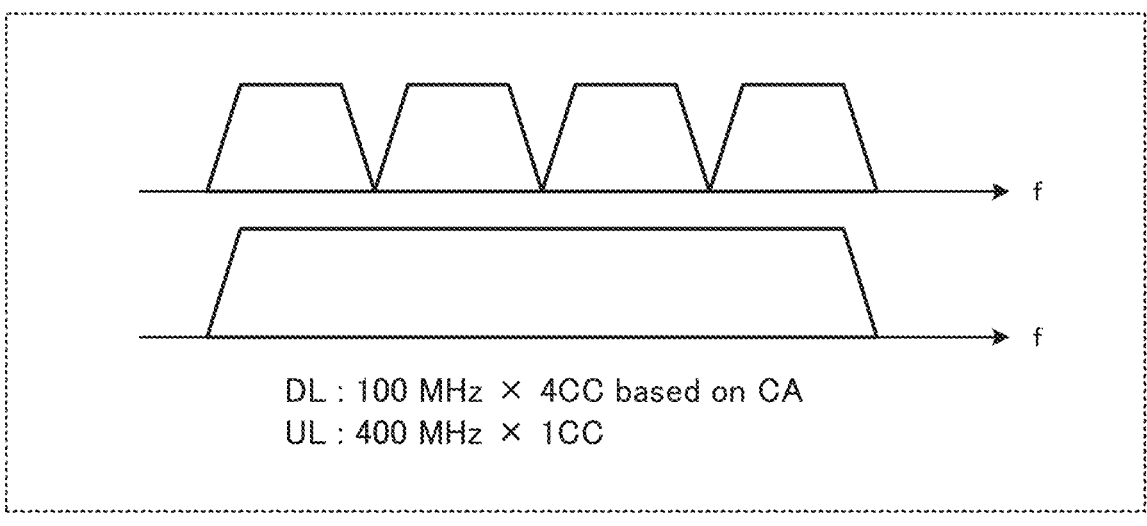
FIG. 11 illustrates exemplary frequency bands allocated to the terminal according to Embodiment 3.

FIG. 11 illustrates exemplary frequency bands allocated to the terminal configured with broad band carriers for UE. In FIG. 11, bands of 4 CCs are configured for DL by CA (e.g., 100 MHz×4 CCs) as is the case with FIG. 10, and a band of a single CC that corresponds to 4 CCs is configured for UL (400 MHz×1 CC), for example.

Here, it is assumed that a single CC with a broad band (e.g., 400 MHz), as with UL, may be configured for DL for the 400 MHz allocated for DL illustrated in FIG. 11. However, when the terminals respectively allocated the frequency bands illustrated in FIGS. 10 and 11 coexist, the configurations of the DL frequency bands (a plurality of CCs with 100 MHz per CC in FIGS. 10 and 11) are preferably the same in terms of DL scheduling.

Thus, terminal 30 configured with a broad band carrier for UL may have different configurations of the frequency bands (i.e., the configurations of the CCs) between DL and UL, as illustrated in FIG. 11.

In the present embodiment, for example, terminal 30 configured with a broad band carrier for UL may be configured with different center frequencies between UL and DL in the frequency band (e.g., BWP). In other words, terminal 30 configured with a broad band carrier for UL is not bound by the restriction of aligning the center frequencies of the DL and UL frequency bands in the TDD.

For example, terminal capability information (e.g., UE capability) of terminal 30 may include information indicating whether to allow the different center frequencies of the frequency bands between DL and UL.

The network side (e.g., base station 10 or base station 20) determines the frequency bands to allocate to terminal 30 (e.g., frequency bands illustrated in FIG. 10 or FIG. 11), for example, based on the terminal capability information of terminal 30.

For terminal 30 not allowing the different center frequencies of the frequency bands between DL and UL, the network side configures a pair of DL and UL bands (also referred to as BWPs) with aligned center frequencies in a single CC among a plurality of CCs, for example.

For terminal 30 allowing the different center frequencies of the frequency bands between DL and UL, in contrast, the network side can configure the broad band UL frequency band (i.e., BWP) so as to overlap with a plurality of CCs for DL, as illustrated in FIG. 11.

Terminal 30 then controls transmission of a UL signal or reception of a DL signal, for example, using allocation information indicating the allocated frequency bands.

As described above, in the present embodiment, the first transmission parameter corresponds to a reception parameter used for DL reception (e.g., a parameter on a configuration of a frequency band allocated for DL), and the example of the first transmission parameter is the parameter on the frequency bands allocated for UL illustrated in FIG. 10. Terminal 30 applies, to UL transmission, the second transmission parameter (e.g., the parameter on the frequency band allocated for UL illustrated in FIG. 11) different from the first transmission parameter. For example, terminal 30 performs UL transmission in a frequency band with a center frequency different from a center frequency for DL reception based on the second transmission parameter, as illustrated in FIG. 11.

For UL, this transmission processing enables terminal 30 to improve the UL throughput by the UL broad band transmission. Further for DL, frequency utilization efficiency of DL can be improved by aligning the configuration of the frequency band (e.g., CC) allocated to terminal 30 with the configuration of the frequency band allocated to another terminal.

By way of example, a description has been given in the present embodiment of a case where the center frequencies of the CCs of DL and UL are different from each other as illustrated in FIG. 11. For terminal 30 configured with the frequency band illustrated in FIG. 11, however, the scheduling may be performed in a unit of the CC with 100 MHz as described above, and radio processing (Radio Frequency (RF) processing) may be performed in a unit of the allocated band (400 MHz in FIG. 11), for example. With this processing, the center frequency is not changed in the RF processing at the time of switching between DL and UL in the TDD in terminal 30, thereby reducing the complexity of processing in terminal 30.

Embodiments of the present disclosure have been described, thus far.

Note that, although a case of base station 20 as a UL reception-only station has been described in the above embodiments, base station 20 need not be a UL reception-only station. For example, base station 20 may include a configuration related to DL transmission processing in addition to a configuration related to UL reception processing.

In addition, a plurality of base stations including both DL transmission processing and UL reception processing may be densely deployed as illustrated in FIG. 3, for example. In this case, for example, at least one of the plurality of base stations may perform the UL reception processing without performing the DL transmission processing, as is the case with base station 20 illustrated in FIG. 4.

Further, terminal 30 may be switched between two cases depending on the state of terminal 30 (e.g., a UL transmission band, a communication environment, or a service content, etc.), for example. One of the cases is a case where terminal 30 is connected to the same base station for both DL and UL as illustrated in FIG. 3, and the other is a case where terminal 30 is connected to different base stations for DL and UL as illustrated in FIG. 4.

In the above embodiment, the parameters on beam control, TA control, and a configuration of a frequency band have been described as examples of the parameters configured when the base station connected to terminal 30 for DL and the base station connected to terminal 30 for UL are different from each other. Such parameters, however, may be parameters on another processing different from beam control, TA control, and a configuration of a frequency band.

Further, at least two of Embodiments 1, 2, and 3 described above may be combined with each other.

(Hardware Configuration)

Note that, the block diagrams used to describe the above embodiment illustrate blocks on the basis of functions. These functional blocks (component sections) are implemented by any combination of at least hardware or software. A method for implementing the functional blocks is not particularly limited. That is, the functional blocks may be implemented using one physically or logically coupled apparatus. Two or more physically or logically separate apparatuses may be directly or indirectly connected (for example, via wires or by radio), and the plurality of apparatuses may be used to implement the functional blocks. The functional blocks may be implemented by combining software with the one apparatus or the plurality of apparatuses described above.

The functions include, but not limited to, judging, deciding, determining, computing, calculating, processing, deriving, investigating, searching, confirming, receiving, transmitting, outputting, accessing, solving, selecting, choosing, establishing, comparing, supposing, expecting, regarding, broadcasting, notifying, communicating, forwarding, configuring, reconfiguring, allocating, mapping, assigning, and the like. For example, a functional block (component section) that functions to achieve transmission is referred to as "transmission section", "transmitting unit", or "transmitter". The methods for implementing the functions are not particularly limited as described above.

Figure 12:
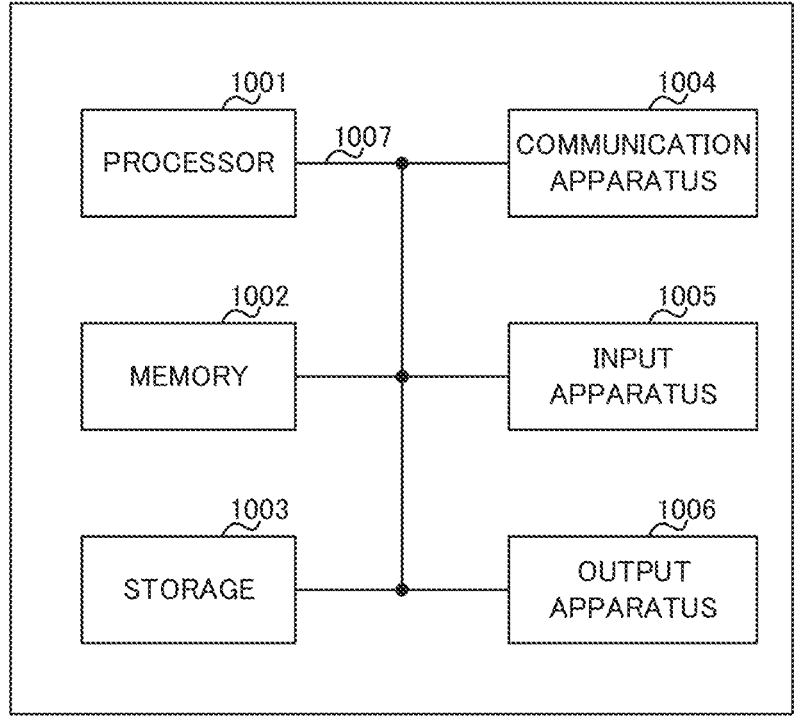
FIG. 12 illustrates an exemplary hardware configuration of the base station and the terminal.

For example, the base station, the user terminal, and the like according to an embodiment of the present disclosure may function as a computer that executes processing of a radio communication method of the present disclosure. FIG. 12 illustrates an exemplary hardware configuration of base station 10, base station 20, and terminal 30 according to one embodiment of the present disclosure. Physically, base station 10, base station 20, and terminal 30 as described above may be configured as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of base station 10, base station 20, and terminal 30 may include one apparatus or a plurality of apparatuses illustrated in the drawings or may not include part of the apparatuses.

The functions of base station 10, base station 20, and terminal 30 are implemented by predetermined software (program) loaded into hardware, such as processor 1001, memory 1002, and the like, according to which processor 1001 performs the arithmetic and controls communication performed by communication apparatus 1004 or at least one of reading and writing of data in memory 1002 and storage 1003.

Processor 1001 operates an operating system to control the entire computer, for example. Processor 1001 may be composed of a central processing unit (CPU) including an interface with peripheral apparatuses, control apparatus, arithmetic apparatus, register, and the like. For example, control sections 101, 201, and 301, and the like as described above may be implemented using processor 1001.

Processor 1001 reads a program (program code), a software module, data, and the like from at least one of storage 1003 and communication apparatus 1004 to memory 1002 and performs various types of processing according to the program (program code), the software module, the data, and the like. As the program, a program for causing the computer to perform at least a part of the operation described in the above embodiments is used. For example, control sections 101, 201 and 301 of base station 10, base station 20, and terminal 30 may be implemented using a control program stored in memory 1002 and operated by processor 1001, and the other functional blocks may also be implemented in the same way. While it has been described that the various types of processing as described above are performed by one processor 1001, the various types of processing may be performed by two or more processors 1001 at the same time or in succession. Processor 1001 may be implemented using one or more chips. Note that the program may be transmitted from a network through a telecommunication line.

Memory 1002 is a computer-readable recording medium and may be composed of, for example, at least one of a Read Only Memory (ROM), an Erasable Programmable ROM (EPROM), an Electrically Erasable Programmable ROM (EEPROM), and a Random Access Memory (RAM). Memory 1002 may be called as a register, a cache, a main memory (main storage apparatus), or the like. Memory 1002 can save a program (program code), a software module, and the like that can be executed to perform the radio communication method according to an embodiment of the present disclosure.

Storage 1003 is a computer-readable recording medium and may be composed of, for example, at least one of an optical disk such as a Compact Disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may also be called as an auxiliary storage apparatus. The storage medium as described above may be, for example, a database, a server, or other appropriate media including at least one of memory 1002 and storage 1003.

Communication apparatus 1004 is hardware (transmission and reception device) for communication between computers through at least one of wired and radio networks and is also called as, for example, a network device, a network controller, a network card, or a communication module. Communication apparatus 1004 may be configured to include a high frequency switch, a duplexer, a filter, a frequency synthesizer, and the like in order to achieve at least one of Frequency Division Duplex (FDD) and Time Division Duplex (TDD), for example. For example, transmission sections 102 and 303, reception sections 202 and 302, and the like as described above may be implemented using communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which makes outputs to the outside. Note that input apparatus 1005 and output apparatus 1006 may be integrated (for example, a touch panel).

The apparatuses, such as processor 1001, memory 1002, and the like are connected by bus 1007 for communication of information. Bus 1007 may be configured using a single bus or using buses different between each pair of the apparatuses.

Furthermore, base station 10, base station 20, and terminal 30 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented using at least one of these pieces of hardware.

(Notification of Information and Signaling)

The notification of information is not limited to the aspects or embodiments described in the present disclosure, and the information may be notified by another method. For example, the notification of information may be performed out by one or a combination of physical layer signaling (for example, Downlink Control Information (DCI) and Uplink Control Information (UCI)), upper layer signaling (for example, Radio Resource Control (RRC) signaling, Medium Access Control (MAC) signaling, notification information (Master Information Block (MIB), and System Information Block (SIB))), and other signals. The RRC signaling may be called an RRC message and may be, for example, an RRC connection setup message, an RRC connection reconfiguration message, or the like.

(Adaptive System)

The aspects and embodiments described in the present specification may be applied to at least one of systems using Long Term Evolution (LTE), LTE-Advanced (LTE-A), SUPER 3G, IMT-Advanced, the 4th generation mobile communication system (4G), the 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or other appropriate systems and a next-generation system extended based on the above systems. Additionally or alternatively, a combination of two or more of the systems (e.g., a combination of at least LTE or LTE-A and 5G) may be applied.

(Processing Procedure and the Like)

The orders of the processing procedures, the sequences, the flow charts, and the like of the aspects and embodiments described in the present disclosure may be changed as long as there is no contradiction. For example, elements of various steps are presented in exemplary orders in the methods described in the present disclosure, and the methods are not limited to the presented specific orders.

(Operation of Base Station)

Specific operations which are described in the present disclosure as being performed by the base station may sometimes be performed by an upper node depending on the situation. Various operations performed for communication with a user terminal in a network constituted by one network node or a plurality of network nodes including a base station can be obviously performed by at least one of the base station and a network node other than the base station (examples include, but not limited to, MME or S-GW). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed using a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called as software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, the information, and the like may be transmitted and received through a transmission medium. For example, when the software is transmitted from a website, a server, or another remote source by using at least one of a wired technique (e.g., a coaxial cable, an optical fiber cable, a twisted pair, and a digital subscriber line (DSL)) and a radio technique (e.g., an infrared ray and a microwave), the at least one of the wired technique and the radio technique is included in the definition of the transmission medium.

(Information and Signals)

The information, the signals, and the like described in the present disclosure may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present disclosure and the terms necessary to understand the present disclosure may be replaced with terms with the same or similar meaning. For example, at least one of the channel and the symbol may be a signal (signaling). The signal may be a message. The component carrier (CC) may be called a carrier frequency, a cell, a frequency carrier, or the like.

("System" and "Network")

The terms "system" and "network" used in the present disclosure can be interchangeably used.

(Names of Parameters and Channels)

The information, the parameters, and the like described in the present disclosure may be expressed using absolute values, using values relative to predetermined values, or using other corresponding information. For example, radio resources may be indicated by indices.

The names used for the parameters are not limitative in any respect. Furthermore, the numerical formulas and the like using the parameters may be different from the ones explicitly disclosed in the present disclosure. Various channels (for example, PUCCH and PDCCH) and information elements, can be identified by any suitable names, and various names assigned to these various channels and information elements are not limitative in any respect.

(Base Station)

The terms "Base Station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", and "component carrier" may be used interchangeably in the present disclosure. The base station may be called a macro cell, a small cell, a femtocell, or a pico cell.

The base station can accommodate one cell or a plurality of (for example, three) cells. When the base station accommodates a plurality of cells, the entire coverage area of the base station can be divided into a plurality of smaller areas, and each of the smaller areas can provide a communication service based on a base station subsystem (for example, small base station for indoor remote radio head (RRH)). The term "cell" or "sector" denotes part or all of the coverage area of at least one of the base station and the base station subsystem that perform the communication service in the coverage.

(Terminal)

The terms "Mobile Station (MS)", "user terminal", "User Equipment (UE)", and "terminal" may be used interchangeably in the present disclosure.

The mobile station may be called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or by some other appropriate terms.

(Base Station/Mobile Station)

At least one of the base station and the mobile station may be called a transmission apparatus, a reception apparatus, a communication apparatus, or the like. Note that, at least one of the base station and the mobile station may be a device mounted in a mobile entity, the mobile entity itself, or the like. The mobile entity may be a vehicle (e.g., an automobile or an airplane), an unmanned mobile entity (e.g., a drone or an autonomous vehicle), or a robot (a manned-type or unmanned-type robot). Note that, at least one of the base station and the mobile station also includes an apparatus that does not necessarily move during communication operation. For example, at least one of the base station and the mobile station may be Internet-of-Things (IoT) equipment such as a sensor.

The base station in the present disclosure may also be replaced with the user terminal. For example, the aspects and the embodiments of the present disclosure may find application in a configuration that results from replacing communication between the base station and the user terminal with communication between multiple user terminals (such communication may, for example, be referred to as device-to-device (D2D), vehicle-to-everything (V2X), or the like). In this case, user terminal 20 may be configured to have the functions that base station 10 described above has. The wordings "uplink" and "downlink" may be replaced with a corresponding wording for inter-equipment communication (for example, "side"). For example, an uplink channel, a downlink channel, and the like may be replaced with a side channel.

Similarly, the user terminal in the present disclosure may be replaced with the base station. In this case, base station 10 is configured to have the functions that user terminal 20 described above has.

Meaning and Interpretation of Terms

As used herein, the term "determining" may encompass a wide variety of actions. For example, "determining" may be regarded as judging, calculating, computing, processing, deriving, investigating, looking up, searching (or, search or inquiry) (e.g., looking up in a table, a database or another data structure), ascertaining and the like. Furthermore, "determining" may be regarded as receiving (for example, receiving information), transmitting (for example, transmitting information), inputting, outputting, accessing (for example, accessing data in a memory) and the like. Also, "determining" may be regarded as resolving, selecting, choosing, establishing, comparing and the like. That is, "determining" may be regarded as a certain type of action related to determining. Also, "determining" may be replaced with "assuming", "expecting", "considering", and the like.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. For example, "connected" may be replaced with "accessed." When the terms are used in the present disclosure, two elements can be considered to be "connected" or "coupled" to each other using at least one of one or more electrical wires, cables, and printed electrical connections or using electromagnetic energy with a wavelength of a radio frequency domain, a microwave domain, an optical (both visible and invisible) domain, or the like that are non-limiting and non-inclusive examples.

The reference signal can also be abbreviated as an RS and may also be called as a pilot depending on the applied standard.

The description "based on" used in the present disclosure does not mean "based only on", unless otherwise specified. In other words, the description "based on" means both of "based only on" and "based at least on".

Any reference to elements by using the terms "first", "second", and the like that are used in the present disclosure does not generally limit the quantities of or the order of these elements. The terms can be used as a convenient method of distinguishing between two or more elements in the present disclosure. Therefore, reference to first and second elements does not mean that only two elements can be employed, or that the first element has to precede the second element somehow.

The "section" in the configuration of each apparatus may be replaced with "means", "circuit", "device", or the like.

In a case where terms "include", "including", and their modifications are used in the present disclosure, these terms are intended to be inclusive like the term "comprising". Further, the term "or" used in the present disclosure is not intended to be an exclusive or.

The radio frame may be constituted by one frame or a plurality of frames in the time domain. The one frame or each of the plurality of frames may be called a subframe in the time domain. The subframe may be further constituted by one slot or a plurality of slots in the time domain. The subframe may have a fixed time length (e.g., 1 ms) independent of numerology.

The numerology may be a communication parameter that is applied to at least one of transmission and reception of a certain signal or channel. The numerology, for example, indicates at least one of SubCarrier Spacing (SCS), a bandwidth, a symbol length, a cyclic prefix length, Transmission Time Interval (TTI), the number of symbols per TTI, a radio frame configuration, specific filtering processing that is performed by a transmission and reception apparatus in the frequency domain, specific windowing processing that is performed by the transmission and reception apparatus in the time domain, and the like.

The slot may be constituted by one symbol or a plurality of symbols (e.g., Orthogonal Frequency Division Multiplexing (OFDM)) symbol, Single Carrier-Frequency Division Multiple Access (SC-FDMA) symbol, or the like) in the time domain. The slot may also be a time unit based on the numerology.

The slot may include a plurality of mini-slots. Each of the mini-slots may be constituted by one or more symbols in the time domain. Furthermore, the mini-slot may be referred to as a subslot. The mini-slot may be constituted by a smaller number of symbols than the slot. A PDSCH (or a PUSCH) that is transmitted in the time unit that is greater than the mini-slot may be referred to as a PDSCH (or a PUSCH) mapping type A. The PDSCH (or the PUSCH) that is transmitted using the mini-slot may be referred to as a PDSCH (or PUSCH) mapping type B.

The radio frame, the subframe, the slot, the mini slot, and the symbol indicate time units in transmitting signals. The radio frame, the subframe, the slot, the mini slot, and the symbol may be called by other corresponding names.

For example, one subframe, a plurality of continuous subframes, one slot, or one mini-slot may be called a Transmission Time Interval (TTI). That is, at least one of the subframe and the TTI may be a subframe (1 ms) in the existing LTE, a duration (for example, 1 to 13 symbols) that is shorter than 1 ms, or a duration that is longer than 1 ms. Note that, a unit that represents the TTI may be referred to as a slot, a mini-slot, or the like instead of a subframe.

Here, the TTI, for example, refers to a minimum time unit for scheduling in radio communication. For example, in an LTE system, the base station performs scheduling for allocating a radio resource (a frequency bandwidth, a transmit power, and the like that are used in each user terminal) on the basis of TTI to each user terminal. Note that, the definition of TTI is not limited to this.

The TTI may be a time unit for transmitting a channel-coded data packet (a transport block), a code block, or a codeword, or may be a unit for processing such as scheduling and link adaptation. Note that, when the TTI is assigned, a time section (for example, the number of symbols) to which the transport block, the code block, the codeword, or the like is actually mapped may be shorter than the TTI.

Note that, in a case where one slot or one mini-slot is referred to as the TTI, one or more TTIs (that is, one or more slots, or one or more mini-slots) may be a minimum time unit for the scheduling. Furthermore, the number of slots (the number of mini-slots) that make up the minimum time unit for the scheduling may be controlled.

A TTI that has a time length of 1 ms may be referred to as a usual TTI (a TTI in LTE Rel. 8 to LTE Rel. 12), a normal TTI, a long TTI, a usual subframe, a normal subframe, a long subframe, a slot, or the like. A TTI that is shorter than the usual TTI may be referred to as a shortened TTI, a short TTI, a partial TTI (or a fractional TTI), a shortened subframe, a short subframe, a mini-slot, a subslot, a slot, or the like.

Note that the long TTI (for example, the usual TTI, the subframe, or the like) may be replaced with the TTI that has a time length which exceeds 1 ms, and the short TTI (for example, the shortened TTI or the like) may be replaced with a TTI that has a TTI length which is less than a TTI length of the long TTI and is equal to or longer than 1 ms.

A resource block (RB) is a resource allocation unit in the time domain and the frequency domain, and may include one or more contiguous subcarriers in the frequency domain. The number of subcarriers that are included in the RB may be identical regardless of the numerology, and may be 12, for example. The number of subcarriers that are included in the RB may be determined based on the numerology.

In addition, the RB may include one symbol or a plurality of symbols in the time domain, and may have a length of one slot, one mini slot, one subframe, or one TTI. One TTI and one subframe may be constituted by one resource block or a plurality of resource blocks.

Note that one or more RBs may be referred to as a Physical Resource Block (PRB), a Sub-Carrier Group (SCG), a Resource Element Group (REG), a PRB pair, an RB pair, or the like.

In addition, the resource block may be constituted by one or more Resource Elements (REs). For example, one RE may be a radio resource region that is one subcarrier and one symbol.

A bandwidth part (BWP) (which may be referred to as a partial bandwidth or the like) may represent a subset of contiguous common resource blocks (RB) for certain numerology in a certain carrier. Here, the common RBs may be identified by RB indices that use a common reference point of the carrier as a reference. The PRB may be defined by a certain BWP and may be numbered within the BWP.

The BWP may include a UL BWP and a DL BWP. An UE may be configured with one or more BWPs within one carrier.

At least one of the configured BWPs may be active, and the UE does not have to assume transmission/reception of a predetermined signal or channel outside the active BWP. Note that, "cell", "carrier", and the like in the present disclosure may be replaced with "BWP".

Structures of the radio frame, the subframe, the slot, the mini-slot, the symbol, and the like are described merely as examples. For example, the configuration such as the number of subframes that are included in the radio frame, the number of slots per subframe or radio frame, the number of mini-slots that are included within the slot, the numbers of symbols and RBs that are included in the slot or the mini-slot, the number of subcarriers that are included in the RB, the number of symbols within the TTI, the symbol length, the Cyclic Prefix (CP) length, and the like can be changed in various ways.

In a case where articles, such as "a", "an", and "the" in English, for example, are added in the present disclosure by translation, nouns following these articles may have the same meaning as used in the plural.

Variations and the Like of Aspects

The aspects and embodiments described in the present disclosure may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present disclosure has been described in detail, it is obvious to those skilled in the art that the present disclosure is not limited to the embodiments described in the present disclosure. Modifications and variations of the aspects of the present disclosure can be made without departing from the spirit and the scope of the present disclosure defined by the description of the appended claims. Therefore, the description of the present disclosure is intended for exemplary description and does not limit the present disclosure in any sense.

INDUSTRIAL APPLICABILITY

One aspect of the present disclosure is useful for radio communication systems.

REFERENCE SIGNS LIST

10, 20 Base station
30 Terminal
101, 201, 301 Control section
102, 303 Transmission section
202, 302 Reception section

The invention claimed is:

1. A terminal comprising:
a processor that controls a beam used for transmission of a sounding reference signal (SRS) in accordance with presence or absence of a configuration of a spatial domain parameter for the SRS; and
a transmitter that transmits the SRS using the beam,
wherein the processor respectively uses different beams for a plurality of resources for the SRS when the spatial domain parameter is not configured,
the processor configures a transmission beam based on resource information indicating a physical random access channel (PRACH) resource, the resource information being received from a first transmission/reception point (TRP),
the transmitter transmits a PRACH signal to a second TRP using the configured transmission beam, and
the processor adjusts a transmission timing of an uplink signal for the second TRP based on a timing advance (TA) value received only from the first TRP in a random access response (RAR) and configured by the first TRP in place of the second TRP.

2. The terminal according to claim 1, wherein the processor determines the beam based on information indicating a beam used for another signal when the spatial domain parameter is configured, the information being included in the spatial domain parameter.

3. The terminal according to claim 1, wherein the spatial domain parameter is included in resource information for the SRS.

4. The terminal according to claim 1, wherein the transmitter transmits, to a base station, UE capability including a number of resources for the SRS supported by the terminal.

5. A terminal comprising:
a processor that controls a beam used for transmission of a sounding reference signal (SRS) in accordance with presence or absence of a configuration of a spatial domain parameter for the SRS; and
a transmitter that transmits the SRS using the beam,
wherein the processor uses a fixed beam for a plurality of resources for the SRS when the spatial domain parameter is not configured, the processor configures a transmission beam based on resource information indicating a physical random access channel (PRACH) resource, the resource information being received from a first transmission/reception point (TRP),
the transmitter transmits a PRACH signal to a second TRP using the configured transmission beam, and
the processor adjusts a transmission timing of an uplink signal for the second TRP based on a timing advance (TA) value received only from the first TRP in a random access response (RAR) and configured by the first TRP in place of the second TRP.

6. The terminal according to claim 5, wherein the processor determines the beam based on information indicating a beam used for another signal when the spatial domain parameter is configured, the information being included in the spatial domain parameter.

7. The terminal according to claim 5, wherein the spatial domain parameter is included in resource information for the SRS.

8. The terminal according to claim 5, wherein the transmitter transmits, to a base station, UE capability including a number of resources for the SRS supported by the terminal.

9. A communication method comprising:
controlling, by a terminal, a beam used for transmission of a sounding reference signal (SRS) in accordance with presence or absence of a configuration of a spatial domain parameter for the SRS;
transmitting, by the terminal, the SRS using the beam;
configuring, by the terminal, a transmission beam based on resource information indicating a physical random access channel (PRACH) resource, the resource information being received from a first transmission/reception point (TRP);
transmitting, by the terminal, a PRACH signal to a second TRP using the configured transmission beam; and
adjusting, by the terminal, a transmission timing of an uplink signal for the second TRP based on a timing advance (TA) value received only from the first TRP in a random access response (RAR) and configured by the first TRP in place of the second TRP,
wherein the terminal respectively uses different beams for a plurality of resources for the SRS when the spatial domain parameter is not configured.

10. A communication method comprising:
controlling, by a terminal, a beam used for transmission of a sounding reference signal (SRS) in accordance with presence or absence of a configuration of a spatial domain parameter for the SRS;
transmitting, by the terminal, the SRS using the beam;
configuring, by the terminal, a transmission beam based on resource information indicating a physical random access channel (PRACH) resource, the resource information being received from a first transmission/reception point (TRP);
transmitting, by the terminal, a PRACH signal to a second TRP using the configured transmission beam; and
adjusting, by the terminal, a transmission timing of an uplink signal for the second TRP based on a timing advance (TA) value received only from the first TRP in a random access response (RAR) and configured by the first TRP in place of the second TRP,
wherein the terminal uses a fixed beam for a plurality of resources for the SRS when the spatial domain parameter is not configured.

11. A system comprising:

a terminal including:

a processor that controls a beam used for transmission of a sounding reference signal (SRS) in accordance with presence or absence of a configuration of a spatial domain parameter for the SRS; and a transmitter that transmits the SRS using the beam, wherein the processor respectively uses different beams for a plurality of resources for the SRS when the spatial domain parameter is not configured, the processor configures a transmission beam based on resource information indicating a physical random access channel (PRACH) resource, the resource information being received from a first transmission/reception point (TRP), the transmitter transmits a PRACH signal to a second TRP using the configured transmission beam, and the processor adjusts a transmission timing of an uplink signal for the second TRP based on a timing advance (TA) value received only from the first TRP in a random access response (RAR) and configured by the first TRP in place of the second TRP; and a base station including a receiver that receives the SRS.

12. A system comprising:

a terminal including:

a processor that controls a beam used for transmission of a sounding reference signal (SRS) in accordance with presence or absence of a configuration of a spatial domain parameter for the SRS; and a transmitter that transmits the SRS using the beam, wherein the processor uses a fixed beam for a plurality of resources for the SRS when the spatial domain parameter is not configured, the processor configures a transmission beam based on resource information indicating a physical random access channel (PRACH) resource, the resource information being received from a first transmission/reception point (TRP), the transmitter transmits a PRACH signal to a second TRP using the configured transmission beam, and the processor adjusts a transmission timing of an uplink signal for the second TRP based on a timing advance (TA) value received only from the first TRP in a random access response (RAR) and configured by the first TRP in place of the second TRP; and a base station including a receiver that receives the SRS.

* * * * *